(12) United States Patent
Tanaka et al.

(10) Patent No.: US 6,535,337 B1
(45) Date of Patent: Mar. 18, 2003

(54) REFLECTORS AND TRANSFLECTORS

(75) Inventors: Kouichi Tanaka, Tokyo (JP); Hiroyuki Emori, Yono (JP)

(73) Assignees: Nippon Kayaku Kabushiki Kaisha, Tokyo (JP); Polatechno Co., Ltd., Tokyo (JP)

( * ) Notice: Subject to any disclaimer, the term of this patent is extended or adjusted under 35 U.S.C. 154(b) by 0 days.

(21) Appl. No.: 09/744,377

(22) PCT Filed: Jul. 26, 1999

(86) PCT No.: PCT/JP99/03988

§ 371 (c)(1),
(2), (4) Date: Mar. 19, 2001

(87) PCT Pub. No.: WO00/07041

PCT Pub. Date: Feb. 10, 2000

(30) Foreign Application Priority Data

Jul. 31, 1998 (JP) .......................................... 10-216336
Aug. 19, 1998 (JP) .......................................... 10-232618

(51) Int. Cl.⁷ ................................................ G02B 5/02
(52) U.S. Cl. ........................ 359/599; 362/31; 359/601
(58) Field of Search .................................. 359/399, 707; 349/56–68; 428/141

(56) References Cited

U.S. PATENT DOCUMENTS

| | | | | |
|---|---|---|---|---|
| 4,911,529 A | * | 3/1990 | Van De Ven | 359/599 |
| 4,948,690 A | * | 8/1990 | Hisamura et al. | 430/60 |
| 5,672,409 A | * | 9/1997 | Miyakawa et al. | 428/141 |
| 5,995,288 A | * | 11/1999 | Kashima et al. | 359/599 |
| 6,002,464 A | * | 12/1999 | Fujisawa et al. | 349/112 |
| 6,111,699 A | * | 8/2000 | Iwata et al. | 359/599 |
| 6,217,176 B1 | * | 4/2001 | Maekawa | 359/601 |

FOREIGN PATENT DOCUMENTS

| | | | |
|---|---|---|---|
| JP | 9-114003 | 5/1992 | |
| JP | 10-731 | * 1/1998 | ................. 359/599 |
| JP | 10-253805 | 9/1998 | |
| JP | 11-23813 | 1/1999 | |
| JP | 11-38208 | 2/1999 | |
| JP | 11-80688 | 3/1999 | |
| JP | 11-95012 | 4/1999 | |

OTHER PUBLICATIONS

English Abstract of Japanese Reference No. 10–253805.
English Abstract of Japanese Reference No. 11–23813.
English Abstract of Japanese Reference No. 11–38208.
English Abstract of Japanese Reference No. 11–80688.
English Abstract of Japanese Reference No. 11–95012.
English Abstract of Japanese Reference No. 9–114003.
English Abstract of Japanese Reference No. 10–731.

* cited by examiner

Primary Examiner—Thong Nguyen
(74) Attorney, Agent, or Firm—Nields & Lemack

(57) ABSTRACT

Reflective type and transflective type liquid crystal display devices can be improved in the visibility of their display image and can also provide very definite display images when they use a reflector or transflector having a light-scattering layer and a light reflective or transflective layer wherein the light-scattering layer comprises a resin layer containing fine particles dispersed therein, the ten-point average roughness "$R_z$" on the surface of the light scattering-layer is less than 2 µm, the refractive index ratio of the fine particles to the resin layer excluding the fine particles is from 1.001:1 to 1.2:1, and the light-scattering layer has a thickness of 3–50 µm.

10 Claims, 1 Drawing Sheet

REFLECTORS AND TRANSFLECTORS

FIELD OF THE INVENTION

Figure 1:
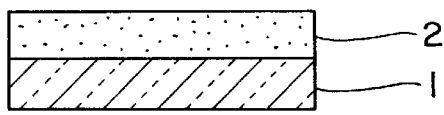

The present invention relates to reflectors or transflectors useful in, for example, reflective type or transflective type liquid crystal display devices.

BACKGROUND OF THE INVENTION

Transflective type liquid crystal display devices used in highly information-oriented portable terminals or the like have functions of both transmissive type liquid crystal display devices using a backlight and reflective type liquid crystal display devices. For example, they can be used as a reflective type liquid crystal display device without backlighting in bright settings and as a transmissive type liquid crystal display device with backlighting in the dark, so that they can save power consumption as compared with transmissive type liquid crystal display devices. Transflective type liquid crystal display devices are equipped with a transflector on the rear of a liquid crystal cell having the same polarizer as used in transmissive type displays, for example. Such a transflector may be formed by vapor-depositing a metal such as silver or aluminium to such an extent to permit the transmission of light on a film surface which has been roughened by, for example, "sand mat method" comprising bombarding a polyester film with hard particles to roughen the film, "coating mat method" comprising coating a polyester film with a resin fluid containing particles to roughen the film, "particles-adding mat method" comprising charging a polyester film with a large amount of organic particles to roughen the film, or "blend mat method" comprising blending a polyester film with a heterogeneous polymer to roughen the film. Liquid crystal display devices using such a transflector can be used as both reflective type and transmissive type liquid crystal display devices because the transflector can serve as not only a reflector but also a diffuser with backlighting as a result of the metal deposition on the roughened film to such an extent to permit the transmission of light. Thus, such a transflector diffuses both reflected light and transmitted light, so that, when used as a reflector, it can prevent a visibility by observers from decreasing by excluding direct reflections on the reflector (the term "direct reflection" used herein means such an unwanted image formed on the reflector or transflector by the reflection of external light as in case of a mirror) and/or widening a viewing angle and also make the reflected light whiter to provide display images being easier to see, and, when used as a diffuser, it can homogeneously diffuse the backlight to provide display images being easier to see.

On the other hand, reflective type liquid crystal display devices have attracted attention, because they make it possible to reduce their weight and power consumption as compared with transmissive type or transflective type liquid crystal display devices using backlighting. Reflective type liquid crystal display devices are equipped with a reflector on the rear of a liquid crystal cell having the same polarizer as used in transmissive type displays, for example. Such a reflector may be obtained by vapor-depositing a metal on a film having been roughened in the same manner as used for the transflector described above and increases diffused reflection by surface roughening, so that, when used in reflective type liquid crystal display devices, it can prevent a visibility by observers from decreasing by excluding direct reflections on the reflector and/or widening a viewing angle and also make the reflected light whiter to provide display images being easier to see.

However, a problem associated with using such a reflector or transflector has been that their surface roughness directly influences the quality of display images and therefore using a reflector or transflector having such a rougher surface lowers the quality of display images to make it difficult to display clearly defined images. Further, a surface having less roughness decreases the diffused reflections. Therefore, a problem associated with using such a surface with less roughness has been that increased direct reflections formed on the reflector or transflector and a narrowed viewing angle make a visibility by observers decreased and that insufficient whiteness of the reflected light decreases a quality of display image.

SUMMARY OF THE INVENTION

As a result of careful studies to solve the above problems, we accomplished the present invention on the basis of the novel finding that without surface roughening process, good reflection characteristics can be obtained by using a reflector or transflector having a light-scattering layer and a light reflective or transflective layer, wherein the light-scattering layer comprises a resin layer containing fine particles dispersed therein, the ten-point average roughness "Rz" on the surface of said light-scattering layer is less than 2 $\mu$m, the refractive index ratio of said fine particles to the resin layer excluding said fine particles is from 1.001:1 to 1.2:1 and said light-scattering layer has a thickness of 3–50 $\mu$m, and that the quality of display images can be remarkably improved when such a reflector or transflector is used in image display devices such as reflective type or transflective type liquid crystal display devices.

Accordingly, the present invention relates to:

(1) a reflector or transflector having a light-scattering layer and a light reflective or transflective layer wherein the light-scattering layer comprises a resin layer containing fine particles dispersed therein, the ten-point average roughness "Rz" on the surface of said light-scattering layer is less than 2 $\mu$m, the refractive index ratio of said fine particles to the resin layer excluding said fine particles is from 1.001:1 to 1.2:1, and said light-scattering layer has a thickness of 3–50 $\mu$m;

(2) a reflector or transflector as defined in the above item (1) wherein the refractive index of the resin layer excluding said fine particles is 1.3–1.55;

(3) a reflector or transflector as defined in the above item (1) or (2) wherein the amount of said fine particles is 5–50 parts by weight per 100 parts by weight of the resin layer excluding said fine particles;

(4) a reflector or transflector as defined in any one of the above items (1) to (3) wherein said fine particles have an average particle size of 0.5–30 $\mu$m;

(5) a reflector or transflector as defined in any one of the above items (1) to (4) wherein said fine particles are in the form of true spheres;

(6) a reflector or transflector as defined in any one of the above items (1) to (5) wherein said light reflective layer is a film having a metal-deposited surface;

(7) a reflector or transflector as defined in the above item (6) wherein said metal-deposited surface is a surface deposited with silver or aluminium;

(8) a reflector or transflector as defined in any one of the above items (1) to (7) wherein said light-scattering layer is adjacent to said metal-deposited surface;

(9) an optical film having a reflector or transflector as defined in any one of the above items (1) to (8); and

(10) an image display device comprising a reflector or transflector as defined in any one of the above items (1) to (8).

FIG. 1 shows one embodiment of the present reflector or transflector wherein a reflective or transflective layer 1 is in direct contact with a light-scattering layer 2.

Figure 2:
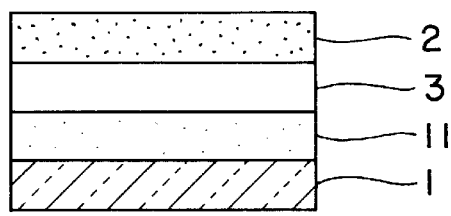

FIG. 2 shows one embodiment of the present reflector or transflector wherein a reflective or transflective layer 1 is joined to a light-scattering layer 2 through a polarizer 3 and an adhesive layer 11.

Figure 3:
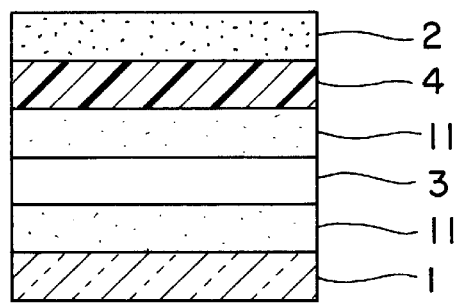

FIG. 3 shows one embodiment of the present reflector or transflector wherein a reflective or transflective layer 1 is joined to a light-scattering layer 2 through an elliptical polarizer consisting of retardation film 4 and polarizer 3 and an adhesive layer 11.

Figure 4:
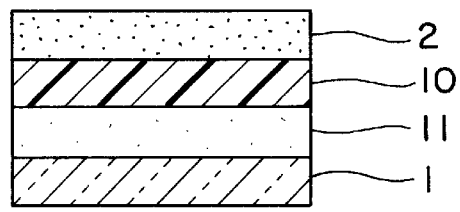

FIG. 4 shows one embodiment of the present reflector or transflector wherein a reflective or transflective layer 1 is joined to a light-scattering layer 2 through a transparent film 10 and an adhesive layer 11.

Figure 5:
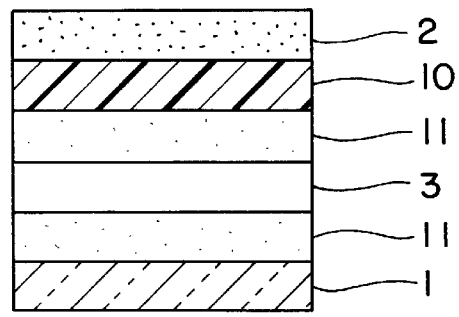

FIG. 5 shows one embodiment of the present reflector or transflector wherein a reflective or transflective layer 1 is joined to a light-scattering layer 2 through a transparent film 10, a polarizer 3 and an adhesive layer 11.

Figure 6:
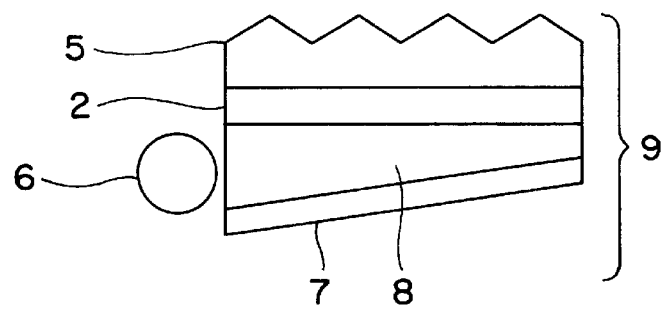

FIG. 6 corresponds to FIG. 13 of Kashima et al., U.S. Pat. No. 5,995,288. The device is comprises a light guide plate 8, a linear light source 6, an optical reflector plate 7, a coating layer 2 of an optical (prism) sheet 5 in contact with the light guide plate 8, and back light equipment 9.

DETAILED DESCRIPTION OF THE INVENTION

Reflectors and transflectors of the present invention have a light-scattering layer and a light reflective or transflective layer wherein the light-scattering layer comprises a resin layer containing fine particles dispersed therein. The surface of the light-scattering layer is preferably substantially smooth, and the ten-point average roughness "Rz" on the surface is less than 2 $\mu$m, preferably less than 1.7 $\mu$m, more preferably less than 1.5 $\mu$m. Fine particles comprising the light-scattering layer have a higher refractive index than that of the resin layer excluding said fine particles, and the refractive index ratio of said fine particles to the resin layer excluding said fine particles is from about 1.001:1 to about 1.2:1, more preferably from about 1.005:1 to about 1.15:1, even more preferably from about 1.01:1 to about 1.1:1.

Fine particles to be used in the present invention are preferably transparent and excellent in dispersibility in the resin layer while satisfying the above ranges of the refractive index ratio to the resin layer excluding said fine particles. The fine particles are preferably in the form of spheres, especially true spheres, and may be fine particles of organic high molecular compounds such as acrylic resins or polyurethane resins or of inorganic compounds such as silica. They should have an average particle size of about 0.5–30 $\mu$m, preferably about 0.5–15 $\mu$m, more preferably about 1–10 $\mu$m. They are preferably charged at an amount of about 5–50 parts by weight, more preferably about 10–40 parts by weight per 100 parts by weight of the resin compounds.

The resin layer excluding fine particles according to the present invention preferably has a low refractive index so that, in the case of the reflector or the reflection mode of the transflector, light can efficiently enter the reflector or transflector and the reflected light can efficiently exit from them and, in the case of the transmission mode of the transflector, the backlight can efficiently exit from the transflector. The refractive index of the resin layer measured by an Abbe's refractometer is preferably about 1.3–1.55, more preferably about 1.3–1.50, even more preferably about 1.3–1.48. In addition, the resin layer is preferably transparent and excellent in dispersibility of the fine particles comprising the light-scattering layer while satisfying the above ranges of the refractive index ratio to the fine particles. Any material may be used to prepare this resin layer with no limitation provided that the material satisfies the above condition. In order to make the refractive index lower, however, the resin layer is preferably made of fluorine-containing high molecular compounds. Examples of fluorine-containing high molecular compounds include solvent-soluble fluorine-containing polymers and solvent-unsoluble fluorine-containing polymers obtained by a curing treatment with heat or radiation.

Examples of solvent-soluble fluorine-containing polymers include fluoroolefin vinyl ether alternating copolymers (FEVE), polyvinylidene fluoride, vinylidene fluoride/tetrafluoroethylene copolymer, vinylidene fluoride/tetrafluoroethylene/hexafluoropropylene terpolymers, and the like.

Examples of solvent-unsoluble fluorine-containing polymers obtained by a curing treatment with heat or radiation include polymers which may be obtained by heat-curing an FEVE containing hydroxyl and/or carboxyl groups with an isocyanate or melamine hardener, polymers which may be obtained by heat-curing a thermosetting fluororesin resulting from the reaction between a perfluoroalkyl ether having a terminal isocyanate group and a perfluoroalkyl ether having a terminal hydroxyl group, polymers which may be obtained by irradiating a radiation-curable fluororesin containing an acrylic ester having a perfluoroalkyl group with a radiation (such as ultraviolet rays), and the like.

The thickness of the resin layer (light-scattering layer) according to the present invention is preferably about 3–50 $\mu$m, more preferably about 10–40 $\mu$m. Said thickness is preferably greater than the average particle size of the fine particles.

The light transflective layer used in the present invention is a layer having both light reflective and transmissive functions. The light transflective layer maybe, for example, a specular reflector obtained by vapor-depositing a metal such as silver or aluminium on a plastic film to such an extent to permit transmission of light in the same manner as in the process for preparing the above reflector, or an adhesive charged with a filler such as titanium oxide or mica. Considering that the reflectance also depends on the type of metal used, silver is preferably used to attain a higher reflectance. The transmittance of said transflector is appropriately controlled by the thickness of the deposited layer or the amount of the filler to be added, depending on the importance of either one of the transmission and reflection of the transflective liquid crystal display device to be used.

The reflective layer used according to the present invention may be, for example, a specular reflector obtained by vapor-depositing a metal such as silver or aluminium on a plastic film or a rolled metal in the form of a smooth thin film such as an aluminium foil. Considering that the reflectance also depends on the type of metal used, silver is preferably used to attain a higher reflectance.

If the metal-deposited surface of the light reflective or transflective layer used according to the present invention is liable to deterioration by, for example, oxygen or moisture, a protective layer may be formed on the metal-deposited surface to prevent the deterioration. Such anti-deterioration treatment is appropriately carried out depending on the type of metal and desired durability.

Transflectors of the present invention preferably have a total light transmittance of about 5–50%, more preferably about 10–45% and a total light reflectance of about 40–90%, more preferably about 45–80% depending on the purpose. If importance is set on reflectivity, the total light transmittance is preferably about 5–30%, more preferably about 10–20% and the total light reflectance is preferably about 60–90%, more preferably about 70–80%. If importance is set on transmissivity, the total light transmittance is preferably about 30–50%, more preferably about 35–45% and the total light reflectance is preferably about 40–60%, more preferably about 45–55%.

In transflectors of the present invention, the light-scattering layer and the transflective layer may be present on the same base or a transparent base comprising the light-scattering layer may be joined to the transflective layer directly or through another transparent base. Suitable bases in transflectors of the present invention include plastic films, for example. As the plastic, thermoplastic resins, thermosetting resins or resins curable with radiation such as UV rays may be used. Examples of the plastics include polyolefin resins such as polyethylene and polypropylene; polyester resins such as polyethylene terephthalate; cellulose resins such as triacetyl cellulose and butyl cellulose; polystyrene; polyurethane; vinyl chloride; acrylic resins; polycarbonate resins; acrylate resins; and the like. Other examples of said transparent base include functional sheet-shaped members such as sheet-shaped optical members represented by, for example, polarizers and retardation films. Such a transflector having a functional sheet-shaped member interposed between a light-scattering layer and a transflective layer can be called as a functional transflector.

In reflectors of the present invention, the light-scattering layer and the reflective layer may be present on the same base or a transparent base comprising the light-scattering layer may be joined to a base comprising the reflective layer directly or through another transparent base. Preferably, the light-scattering layer is adjacent to the reflective layer. Suitable bases in reflectors of the present invention include plastic films, for example. As the plastic, thermoplastic resins, thermosetting resins and resins curable with radiation such as UV rays, may be used. Examples of the plastics include polyolefin resins such as polyethylene and polypropylene; polyester resins such as polyethylene terephthalate; cellulose resins such as triacetyl cellulose and butyl cellulose; polystyrene; polyurethane; vinyl chloride; acrylic resins; polycarbonate resins; acrylate resins; and the like. Other examples of said transparent base include functional sheet-shaped members such as sheet-shaped optical members represented by, for example, polarizers and retardation films. Such a reflector having a functional sheet-shaped member interposed between a light-scattering layer and a reflective layer can be called as a functional reflector.

When the light-scattering layer according to the present invention is formed on the reflective or transflective layer, it can be formed by, for example, adding a fluorine-containing solvent-soluble polymer or a thermosetting fluororesin or a radiation-curable fluororesin and fine particles as described above and optionally a reactive compound, hardener (for thermosetting fluororesins) or photo initiator (for UV-curable fluororesins) to a solvent; homogeneously dissolving or dispersing them in the solvent to obtain a mixed dispersion having a desired concentration; coating the mixed dispersion on a metal-deposited surface of the reflective or transflective layer to a homogeneous thickness; and removing the solvent preferably by a heating treatment; and, when a thermosetting resin is used, further heating the mixture to cure the resin, or when a radiation-curable resin composition is used, applying the radiation to the mixture to cure the resin. Preferred solvents are those which can dissolve said fluorine-containing compounds or resin compositions containing said compounds. Examples of such solvents include aromatic compounds such as toluene and xylene; alcohols such as methanol, ethanol and isopropyl alcohol; ketones such as acetone and methyl ethyl ketone; and esters such as ethyl acetate and butyl acetate. In addition, when perfluoroalkyl compounds are used, so-called fluorine-containing solvents consisting of, for example, perfluoroalkyl compounds may be used. These solvents may be used alone or in admixture at any proportion. Reactive compounds which may be optionally used, include acrylic, urethane, acrylic urethane, epoxy and silicone reactive compounds.

When the dispersibility of the fine particles is insufficient, various dispersants are preferably used. The dispersant may be anionic surfactants such as sulfate esters, monocarboxylates and polycarboxylates; cationic surfactants such as quaternary salts of higher aliphatic amines; nonionic surfactants such as higher fatty acid polyethylene glycol esters; silicone-containing surfactants; fluorine-containing surfactants; polymer type surfactants having amide ester bond; and the like.

Method for applying said mixed dispersion, which is not specifically limited, preferably attains a homogeneous thickness to allow the characteristics of the light-scattering layer to be consistent. Various coating methods can be used, such as comma coating method, wire bar method, dip coating method, spin coating method, gravure coating method, microgravure coating method, and doctor blade coating method. As for the thermosetting resins, the resins should be cured at an appropriate curing temperature considering the critical temperature at which the transparent films can endure and the workability of the films. As for the radiation-curable resins, preferred radiations used for curing said resins include electromagnetic radiations (such as UV rays) having a wavelength of 2000 to 7000 angstroms which can be obtained from high-pressure mercury lamp, low-pressure mercury lamp, xenon lamp, germicidal lamp, laser light or the like; and high-energy radiations such as electron beam, X-ray and other radiations. Irradiation time, which depends on the strength of radiation, generally ranges from about 0.1 to about 10 seconds with sufficient results.

An optical film of the present invention such as a polarizer, a retardation film or an elliptical polarizer can be prepared by bonding with an adhesive a reflector or transflector of the present invention to a polarizier, a retardation film or an elliptical polarizer which comprises a polarizer bonded to a retardation film.

When thus obtained reflector or transflector of the present invention is used in an image display device such as a reflective or transflective type liquid crystal device, the reflector or transflector may be bonded, for example with an adhesive, to one surface of the liquid crystal cell and a polarizer or elliptical polarizer is bonded to the other surface with an adhesive to give the image display device according to the present invention.

EXAMPLES

The present invention is further illustrated by the following examples and comparative examples.

Example 1

100 Parts by weight of Lumiflon LF-600 (a thermosetting resin available from Asahi Glass Co., Ltd. having a refractive index of 1.46 after curing as measured by an Abbe's refractometer; 50% solids in a xylene solution), 2.9 parts by weight of a hardener, Coronate L (available from Nippon Polyurethane Industry Co., Ltd.; 45% solids in a 1:1 ethyl acetate/toluene solution), 0.36 parts by weight of dibutyltin (IV) dilaurate (0.015% solids in a toluene solution) and 10 parts by weight of fine particles of acrylic resin having an average particle size of 6 μm and a refractive index of 1.49, were mixed under high speed stirring to prepare a mixed dispersion, which was then coated by means of a comma coater on the metal(aluminium)-deposited surface of a polyester film on which aluminium had been vapor-deposited (total light transmittance 17.7%). After the solvent was removed, the mixture was cured by heat treatment at 100° C. for 20 minutes to give a transflector of the present invention having a light-scattering layer of 30 μm in thickness. The evaluation results of the resulting transflector are shown in Table 1.

Example 2

100 Parts by weight of Lumiflon LF-600 (a thermosetting resin available from Asahi Glass Co., Ltd. having a refractive index of 1.46 after curing as measured by an Abbe's refractometer; 50% solids in a xylene solution), 2.9 parts by weight of a hardener, Coronate HL (available from Nippon Polyurethane Industry Co., Ltd.; 45% solids in a 1:1 ethyl acetate/toluene solution) and 14 parts by weight of fine particles of an acrylic resin having an average particle size of 6 μm and a refractive index of 1.49, were mixed under high speed stirring to prepare a mixed dispersion. The procedure of Example 1 was repeated using the thus obtained mixed dispersion and a triacetyl cellulose film having a thickness of 80 μm to give a film having a light-scattering layer of 30 μm in thickness. Then, the aluminium-deposited surface of the aluminium-deposited polyester film used in Example 1 was bonded to the film surface (triacetyl cellulose side) of said film having a light-scattering layer with an adhesive to give a transflector of the present invention. The evaluation results of the resulting film are shown in Table 1.

Example 3

A reflector of the present invention having a light-scattering layer of 30 μm in thickness was prepared by the same procedure as in Example 1 except that a reflector obtained by vapor-depositing aluminium on a polyester film was used. The evaluation results of the resulting reflector are shown in Table 2.

Example 4

A reflector of the present invention having a light-scattering layer of 30 μm in thickness was prepared by the same procedure as in Example 1 except that a reflector obtained by vapor-depositing silver on a polyester film was used. The evaluation results of the resulting reflector are shown in Table 2.

Example 5

A reflective film of the present invention was prepared by the same procedure as in Example 2 except that the polyester film having vapor-deposited silver used in Example 4 was used. The evaluation results of the resulting film are shown in Table 2.

Comparative Example 1

A transflector obtained by vapor-depositing aluminium on an uneven polyester film (total light transmittance 12.5%) was evaluated in the same manner as in Example 1. The evaluation results are shown in Table 1.

Comparative Example 2

A reflector obtained by vapor-depositing aluminium on an uneven film was evaluated in the same manner as in Example 1. The evaluation results are shown in Table 2.

Comparative Example 3

A reflector obtained by vapor-depositing silver on an uneven film was evaluated in the same manner as in Example 1. The evaluation results are shown in Table 2.

Comparative Example 4

The silver-deposited polyester film used in Example 2 was evaluated in the same manner as in Example 1. The evaluation results are shown in Table 2.

TABLE 1

| | Total Light Transmittance (%) | Reflectance (%) | | Ten-point Average Roughness Rz (μm) | Direct Reflection | Image Quality |
|---|---|---|---|---|---|---|
| | | Total Light | Diffused Light | | | |
| Ex. 1 | 14.9 | 60.0 | 55.2 | 1.34 | No | A |
| Ex. 2 | 13.5 | 60.2 | 49.2 | 1.40 | No | A |
| Comp. Ex. 1 | 12.5 | 56.1 | 44.8 | 2.52 | No | B |

TABLE 2

| | Reflectance (%) | | Ten-point Average Roughness Rz (μm) | Direct Reflection | Image Quality |
|---|---|---|---|---|---|
| | Total Light | Diffused Light | | | |
| Ex. 3 | 80.0 | 72.7 | 1.34 | No | A |
| Ex. 4 | 91.2 | 85.2 | 1.34 | No | A |
| Ex. 5 | 90.3 | 75.9 | 1.40 | No | A |
| Comp. Ex. 2 | 79.9 | 67.2 | 2.52 | No | B |
| Comp. Ex. 3 | 90.5 | 74.9 | 3.04 | No | B |
| Comp. Ex. 4 | 94.5 | 0.8 | 0.04 | Yes | C |

Total light transmittance, total light reflectance and diffused light reflectance were measured by a spectrophotometer made by Hitachi Ltd.

Ten-point average roughness was determined with a laser microscope made by Lasertech.

Direct reflection was determined by visually evaluating whether or not the observer in front of the reflector or transflector is reflected in the reflective layer.

Image quality was evaluated as follows. Each reflector or transflector was bonded to one side of a liquid crystal cell having polarizers on both sides with an adhesive in such a manner that the light-scattering layer was adjacent to the liquid crystal cell in case of the reflectors or transflectors of the Examples or the metal-deposited surface was adjacent to the liquid crystal cell in case of the reflectors or transflectors of the Comparative Examples. In case of the transflectors, then, an edge light-type backlight was placed on the transflector side of the liquid crystal cell to prepare image display devices of the present invention. Then, the thus obtained image display devices were used to visually evaluate the quality of displayed images according to the following criteria.

A: The background is white and clear, and therefore the display images are easy to see.

B: The background is grayish and roughness of the reflector or transflector can be recognized, and therefore the display image is not easy to see.

C: The background is grayish and a reflection of external light occurs, and therefore the display image is not easy to see.

As seen from Table 1, when comparing Example 1 with Comparative Example 1, the transflector of the Example is remarkably improved over the transflector of the Comparative Example in both the total light reflectance and the diffused light reflectance while the total light transmittance of the former is higher than that of the latter. In addition, the transflector of the present invention has no reflection of external light in the transflector in spite of having a smoother surface than that of the Comparative Example and has a higher diffuse reflectance which makes the reflected light whiter, and with the result that the transflector of the present invention is also improved in the quality of display images. Thus, the transflector of the present invention proves to be an excellent transflector.

As seen from Table 2, when comparing Example 3 with Comparative Example 2 or Example 4 with Comparative Example 3, the reflectors of the Examples are remarkably improved over the reflectors of the Comparative Examples in the diffused light reflectance while the reflectors of the Examples and the reflectors of the Comparative Examples are comparable in the total light reflectance. In addition, the reflectors of the present invention have no reflection of external light in spite of having a smoother surface than that of the Comparative Examples and have a higher diffused light reflectance which makes the reflected light whiter, with the result that the reflectors of the present invention are also improved in the quality of display images. Thus, the reflectors of the present invention prove to be excellent reflectors.

Advantages of the Invention

Reflective type and transflective type liquid crystal display devices can be improved in the quality of their display image and can also provide very definite display images when they use a reflector or transflector having a light-scattering layer and a light reflective or transflective layer wherein the light-scattering layer comprises a resin layer containing fine particles dispersed therein, the ten-point average roughness "Rz" on the surface of said light-scattering layer is less than 2 µm, the refractive index ratio of said fine particles to the resin layer excluding said fine particles is from 1.001:1 to 1.2:1, and said light-scattering layer has a thickness of 3–50 µm.

What is claimed is:

1. A reflector or transflector having a light-scattering layer having a surface and a light reflective or transflective layer, wherein the light-scattering layer is adhered to the light reflective or transflective layer directly or through a transparent base;

the light-scattering layer comprises a resin layer containing fine particles dispersed therein;

the ten-point average roughness Rz on said surface of said light-scattering layer is less than 2 µm;

the refractive index ratio of said fine particles to the resin layer excluding said fine particles is from 1.001:1 to 1.2:1;

said light-scattering layer has a thickness ranging from 3–50 µm; and wherein said transparent base is selected from the group consisting of plastic films and functional sheet-shaped optical members; said plastic films are selected from the group consisting of thermoplastic resins, thermosetting resins and resins curable with radiation; and said functional sheet-shaped optical members are selected from the group consisting of polarizers and retardation films.

2. A reflector or transflector according to claim 1, wherein the refractive index of the resin layer excluding said fine particles is in the range of 1.3–1.55.

3. A reflector or transflector according to claim 1 or 2, wherein the amount of said fine particles is 5–50 parts by weight per 100 parts by weight of the resin layer excluding said fine particles.

4. A reflector or transflector according to claim 3, wherein said fine particles have an average particle size in the range of 0.5–30 µm.

5. A reflector or transflector according to claim 4, wherein said fine particles are in the form of true spheres.

6. A reflector or transflector according to claim 5, wherein said light reflective layer is a film having a metal-deposited surface.

7. A reflector or transflector according to claim 6, wherein said metal-deposited surface is a surface deposited with silver or aluminium.

8. A reflector or transflector according to claim 6 or 7, wherein said light-scattering layer is adjacent to said metal-deposited surface.

9. An optical film having a reflector or transflector according to claim 1 or 2.

10. An image display device having a reflector or transflector according to claim 1 or 2.

* * * * *